United States Patent [19]

Schmidt

[11] 4,208,440
[45] Jun. 17, 1980

[54] ELECTRICALLY SEPARATING A FOOD PASTE

[76] Inventor: Edward D. Schmidt, 5073 Nine Mile Creek Cir., Minneapolis, Minn. 55437

[21] Appl. No.: 33,167

[22] Filed: Apr. 25, 1979

Related U.S. Application Data

[63] Continuation-in-part of Ser. No. 907,945, May 22, 1978, abandoned.

[51] Int. Cl.² .............................................. A23L 3/32
[52] U.S. Cl. ................................ 426/244; 204/180 R; 426/480; 426/481; 426/584; 426/590; 426/593; 426/598; 426/599; 426/653
[58] Field of Search ............... 426/244, 583, 584, 590, 426/593, 598, 599, 615, 622, 627, 631, 634, 639, 650, 653, 657, 658, 431, 478, 480, 481, 237, 239; 204/180 R

[56] References Cited

U.S. PATENT DOCUMENTS

| | | | |
|---|---|---|---|
| 2,348,837 | 5/1944 | Nyrof | 426/593 X |
| 2,614,045 | 10/1952 | Learmonth | 426/244 X |
| 3,119,693 | 1/1964 | Colten et al. | 426/593 |
| 3,687,682 | 8/1972 | Scheder | 426/239 |

*Primary Examiner*—Arthur L. Corbin
*Attorney, Agent, or Firm*—Clayton R. Johnson

[57] ABSTRACT

A beverage base and other products are made from cocoa powder, soy flour, dried whey, corn flour, pea powder, or pea flour by blending the powder or flour with a quantity of water to make a paste that is retained between a pair of metal screens (preferably stainless steel screens) or plates which serve as electrodes. The paste is subjected to a difference of electrical potential until separated into three fractions having different pH's.

37 Claims, 1 Drawing Figure

ELECTRICALLY SEPARATING A FOOD PASTE

CROSS REFERENCE TO RELATED APPLICATIONS

This application is a continuation in part application of my copending application Ser. No. 907,945, filed May 22, 1978, now abandoned.

BACKGROUND OF THE INVENTION

This invention relates to the treatment of cocoa powder, dried whey, corn flour, soy flour, field pea powder and field pea flour.

In U.S. Pat. No. 2,348,837, there is disclosed a method of treating cocoa and chocolate products wherein cocoa is mixed with water to form an emulsion that is passed through an electrical or centrifugal separator to be divided into two or three fractions. This involves continuous fractionation by electrophoresis, a method that differs from the method disclosed herein in that:

1. Continuous fractionation by electrophoresis (and centrifugal separation) requires a free flowing mass; and the dilution ratio of water/powder are much higher than those recommended for use with the invention disclosed herein.

2. Separation by continuous fractionation is quicker than with the method disclosed herein.

3. The fractions obtained by using continuous fractionation by electrophoresis and centrifugal separation differs from the fractions that are obtained by applying the invention disclosed herein. For example, the method disclosed herein produces fractions with distinctly different pH's, which is not the case with continuous fractionation by electrophoresis or centrifugal separation.

U.S. Pat. No. 3,119,693, discloses a process for preparing a dutched cocoa product that is usable for making flavored beverages. The process described in U.S. Pat. No. 3,119,693, requires the addition of an alkali to dutch the cocoa and does not involve fractionation.

As far as is known, real chocolate flavored carbonated beverages are not being marketed for a number of reasons. One of the reasons is that an unsightly residue collects and continues to collect at the base of a water/cocoa mixture no matter how frequently the residue is removed. Other reasons are materials such as cocoa butter migrate to the top and cocoa powder, if consumed while in aqueous dispersion, leaves a gritty mouth feel. Also there is difficulty providing a chocolate flavored beverage having a suitable shelf life.

Also, the price of cocoa powder is rising to the point where numerous artificial cocoa products are on the market including artificial cocoa extenders. Although artificial cocoa extenders are on the market, a method to extend real cocoa powder so that less powder is required to flavor a given product is not. Also, due to the energy crunch in the world today, processes are needed that can rely upon, for the most part, solar energy (D.C. electricity).

In order to provide an improved process for making various cocoa, soy, whey, corn and field pea products this invention has been made.

SUMMARY OF THE INVENTION

Soy flour, corn flour, dried whey, cocoa powder, field pea flour and field pea powder are mixed with water to form a thick paste with a uniform consistency. The paste, while being contained between metal electrodes, preferably stainless steel screens, is subjected to a difference of potential to electrically separate the paste into three fractions with pre-selected pH ranges, and one or more of the fractions is used. Any water soluble parts of two cocoa powder fractions may be combined (or water soluble parts of the two lower pH fractions utilized alone) to make a water soluble chocolate flavor base. Water may be added back to the center, or near neutral portion, a paste formed and treatment repeated with the same three fractions formed.

One of the objects of this invention is to provide a new and novel method of preparing a beverage base from such ingredients as cocoa powder and soy flour. Another object of the invention is to provide a new and novel method for treating ingredients such as cocoa powder and soy flour to reduce the intensity of undesirable flavors and concentrate the more desirable flavors. A further objective is to extend the usage of a given amount of product such as cocoa.

A further objective is to provide a new and novel method of making dutched cocoa, and still another objective of the invention is to provide a new and novel method of producing a protein based soy beverage.

Figure 1:
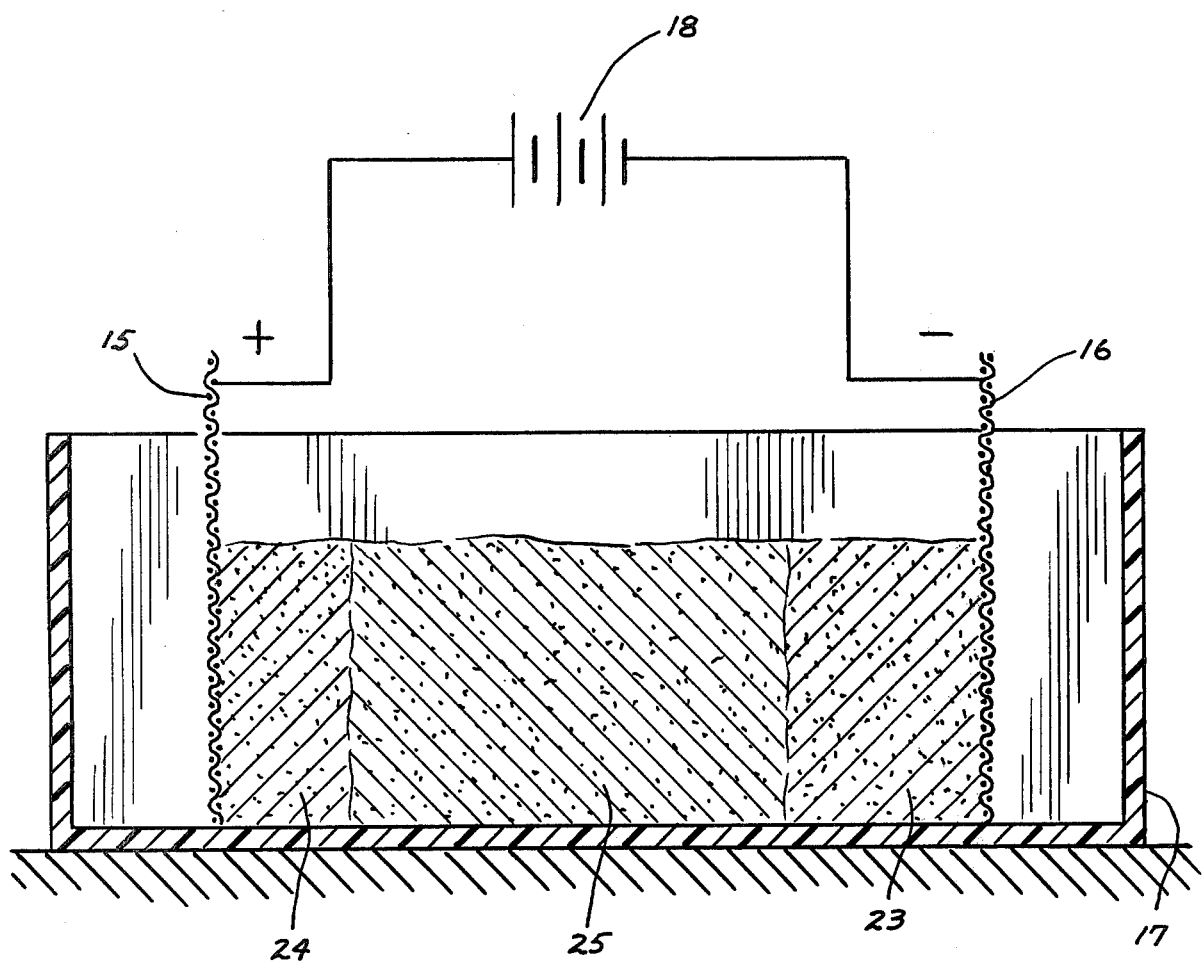
FIG. 1 is a diagrammatic view depicting the electrolytic separation of the food paste into three fractions.

In order to obtain the products of this invention, the food powder (cocoa, corn flour, dried whey, soy flour, field pea flour or field pea powder) and water are blended to obtain a smooth paste of a sufficiently high enough viscosity so that three distinct separable fractions are produced when the paste is treated. It is preferred to have the paste at a high enough viscosity to be retained between two horizontally spaced generally vertical screens 15 & 16. Using screens insures the paste has a high enough viscosity to provide the required separation. Stainless steel plates can be used as electrodes to obtain the required separation; however, stainless steel screens are preferred because they allow the excess water to be removed by electroosmosis (as opposed to evaporation). The screens are horizontally spaced and located within a container 17, in contact with the container bottom, to extend thereacross from side to side and advantageously are spaced from the ends to divide the container into three compartments. The container is a non-electrically conductive type.

Screen 15 is electrically connected to the positive terminal of a D.C. voltage source 18 and the negative terminal of the source is electrically connected to screen 16. The paste is subjected to the difference in potential until it is electrically separated into three different fractions of desired pH's. For cocoa powder fractions, the desired pH's are about 2.3–2.5 for fraction 24, 5.4 to 7.0 for fraction 25, and 12 to 12.6 for fraction 23. Processing time may be 2–8 hours, but is in part dependent on the quantity of the paste and the rating of the power supply.

The paste that is treated in accordance with the invention and the fractions formed by the electrolytic treatment are not sufficiently fluid to measure pH's using a standard type pH meter. Thus, unless otherwise indicated the pH's set forth herein for the paste, powder and fraction were measured of the liquid decanted from a mixture of one part paste (or fraction) and three parts water. The combination of water and the paste or fraction were thoroughly mixed and allowed to set for at least a half hour before the decantation of the liquid.

The paste made from cocoa powder, soy flour, dried whey, corn flour, field pea powder, or field pea flour is subjected to a difference of electrical potential until separated into three fractions having pH's of about 2.3–2.5, 5.4–7.0, and 12.0–12.6, respectively, if the paste was prepared from cocoa powder; about 4.3, 7.0 and 12.0, respectively, if the paste was prepared from soy flour; about 6.0, 6.2 and 11.5, respectively, if the paste was prepared from dried whey; about 3.6, 5.2 and 10, respectively, if the paste was prepared from corn flour; about 4.05, 7.5 and 11.65, respectively, if the paste was prepared from field pea flour; and about 4.55, 6.15 and 11.9, respectively, if the paste was prepared from precooked field pea powder. The above pH's for cocoa powder, corn flour and dried whey are measured of the liquid that was decanted from a mixture of one part of the respective fraction and three parts water; while the above pH's for field pea flour and precooked field pea powder are measured from a liquid that was decanted from a mixture of one part of the respective fraction and five parts water and for soy flour the above pH's are measured of the liquid that was decanted from a mixture of one part of the respective fraction and four parts water. The above fractions have many unique uses; for example, the alkaline fraction of the cocoa paste can be used in place of dutched cocoa in cake, the acid and alkaline fractions can be used to produce a stable real chocolate base for beverages and the acid and alkaline fractions can be combined to produce products with a greater flavor impact than the cocoa powder had prior to treatment (flavor is extended). By separating the cocoa into fractions and recombining the fractions, a smaller amount of the thus treated cocoa has to be used to obtain a specific color and flavor level than if untreated cocoa was used to obtain the same color and flavor level. If soy flour is used, the resulting fractions can be used for the production of a protein beverage base or "soy milk". If the corn flour is used the resulting fractions can be used for the production of a pleasant tasting high carbohydrate beverage.

When treating a blend of 70% water and 30% cocoa powder (with an initial pH of the blend of about 8.0—a dutched cocoa) about 20% of the blend would end up in fraction 23, about 11% of the blend would end up in fraction 24 and 46% of the blend would end up in fraction 25. About 23% of the weight loss would be due to water loss during the process. During the treatment, water was driven toward the negative terminal of the power supply. After the electrolytic separation the paste fractions are placed in containers (not shown) to be used separately or reblended together as required. A regular cocoa powder, pH of about 6, can be treated as set forth above.

Using cocoa powder (pH 7.0) as an example, 200 grams of cocoa and 400 grams of water were blended to form a smooth paste. The paste containing only cocoa powder and water, was placed between screens 15 and 16 in contact therewith, the screen having openings 1/16" high and 1/16" wide. The voltage source was a 12 volt D.C. source and was applied for eight hours. About ½–1 amps were drawn initially.

At the end of the electrolytic treatment, the fraction 23 which was adjacent screen 16 was a dark colored moist high alkaline mass (pH of 12.3) and contained flavors that appeared undesirable for use in beverages. The fraction 24 which was closest to screen 15 was light colored and had a pH of 2.4 while the central fraction 25, light in color also, had a pH of 6.7. Fraction 23 was 65 grams, fraction 24 was 75 grams and the remainder was in fraction 25 (excluding water loss). Power requirements used for the process can be supplied by solar cells. Interestingly enough during the process there is a drying action (electroosmosis). Typical analysis of the cocoa powder and the three fractions is as follows:

|  | Cocoa Powder | Fraction 23 | Fraction 24 | Fraction 25 |
| --- | --- | --- | --- | --- |
| Protein | 25.79% | 6.65% | 13.22% | 10.47% |
| Carbohydrates | 44.50% | 13.19% | 29.09% | 18.95% |
| Fat | 15.61% | 2.67% | 4.68% | 3.75% |
| Moisture | 6.00% | 70.64% | 51.00% | 64.88% |
| Ash | 8.05% | 6.83% | 2.00% | 1.94% |
| *pH | 6.84 | 11.17 | 2.57 | 5.29 |

*The pH measured was that of the liquid decanted from the mixture of 10 parts water and one part cocoa powder (or fraction), the liquid being decanted after the mixture had been setting for ½ hour.

If desired, water lost during the process can be reblended into the center fraction and the center fraction treated electrically to separate it into three fractions, repeating the process. However there is a limit to the amount of fraction 23 that can be obtained by repeatingly electrically treating the center fraction. Starting with one pound of cocoa and repeated treatment about 0.8 of a pound (on a wet basis) of fraction 23 can be obtained. This indicates flavor material that can be stripped from the cocoa powder and collected.

The high alkaline fraction 23 can be used where dutched cocoa is required, for example in cakes. It is to be noted that no alkali was added to provide this high alkaline fraction.

Fractions 23, 24 and 25 can be combined to provide a stronger tasting chocolate product when compared with the flavor impact of the initial amount of cocoa powder prepared for treatment and going into these fractions. It has not been known to obtain increased flavor and color levels from a food ingredient by separating the ingredient into fractions in accordance with the method set forth herein and then recombining them to achieve a specific color and flavor level whereby less of the ingredient has to be used than with prior art methods. That is, the process can be used to extend cocoa in that more product can be flavored per pound of cocoa. Thus one can extend the flavor of cocoa powder by blending one of the three fractions (23, 24 and 25) with at least one of the other two fractions. Also, the pH can be adjusted to accommodate preservatives by varying the mix ratio of fraction 24 and 25. Fractions 24 and 25 can be used for making a chocolate beverage.

At least one fraction can be blended with three parts water to place part of the one fraction in a first solution, the first solution separated from the undissolved part of the fraction, the undissolved part blended with three parts of water to place an additional part of the one fraction in a second solution and the second solution separated from the remaining undissolved part of the fraction. For example, fraction 25 and/or 24 and/or 23 can be blended with about 3 parts of water and allowed to stand for one half hour or more to permit gravitational separation. Then liquid is decanted from the top, and the undissolved bottom portion remains in the bottom of the container. In the event upon whipping the mixture (fraction and water) to blend it and allowing it to stand, at times a fatty mass collects at the top of the liquid. In such an event the liquid should be decanted below the level of the fatty mass to insure obtaining a clear finished product.

Starting out with 90 grams of paste and adding 270 mls of water to fraction 24, 150 mls of water soluble flavor base (water and water soluble part of fraction 24) can be removed. Ninety grams of paste (with water added) will yield at least 1200 mls of flavor base. Fraction 24 is a stronger tasting high acid fraction than the untreated cocoa powder, and therefore, less is required to flavor and acidify a product. The smaller amount of cocoa product required to flavor a beverage minimizes the concern about the stability of the cocoa product in solution. Flavor base prepared from fraction 24 and/or 25 shows little, if any, separation when used to flavor a beverage. Extensive work was not done during these tests to verify the mechanism providing the stability of the flavor base in solution. However, it is common knowledge that solubility of proteins is markedly influenced by pH, solubility being minimum at the iso-electric point. Also the stability appears to be increased due to stripping of some unknown particles from the cocoa powder and these particles being retained in solution. Fractions 23, 24 and 25 can be put into water, water soluble portions decanted off and water soluble portions combined to make a product with a pre-selected color, taste and pH. This last mentioned product can be used to make a carbonated chocolate flavored beverage, or otherwise used. If it is used for purposes of making a beverage, it is preferred that the product has a pH less than 6 (final pH—not pH of decanted liquid as set forth for measuring pH of paste or fraction).

Water can be added back to the undissolved portions and liquid decanted off. At least 1½ gallons of water containing water soluble parts of the three fractions can be produced by adding water to and removing flavor base from a combination of the fractions produced by the disclosed method of treating 1 pound of cocoa. Remaining after all flavor has been removed from the cocoa powder is a water insoluble gritty mass.

Both the flavor bases from fraction 24 and a combination of flavor bases prepared from combining fraction 24 and 25 have been used to make a flavor syrup for a carbonated beverage. A typical formula (by weight) is as follows:

| Sugar Syrup | 42.78% |
|---|---|
| Chocolate flavor base | 56.57% |
| Sodium Benzoate | .6% |
| Color | .05% |

Possibly a better formula (by weight) for a carbonated beverage syrup is as follows:

| Sugar Syrup | 42.78% |
|---|---|
| Chocolate flavor base | 56.47% |
| Sodium Benzoate | .6% |
| Color | .05% |
| Xantham gum | .1% |

Note: Although a touch of Xantham gum was added to impart body to the finished beverage, a number of food grade gums are available that can be used. In each of the above formulas the chocolate flavor base contains about one part of the initially separated fraction and 8 parts liquid.

One part of the flavor syrup can be added to five parts of carbonated water to provide a real chocolate flavored beverage that has a pH of well under 6.0 (5:1 dilution ratio has been selected because it is the standard dilution ratio used by the soda pop beverage industry). Preservatives such as sodium benzoate, or potassium sorbate or a mixture thereof can be added to the beverage. Preservatives, such as the above, are more effective in a beverage having a pH under 6.0 than when used in solutions of higher pH's.

By using the chocolate flavored bases made from fractions 24 and/or 25 in a manner set forth above, a bottled, non-dairy chocolate flavored carbonated beverage is obtained that has a relatively long shelf life without any significant amount of cocoa material settling out of solution or a fat ring forming on top of the bottle. Further, by blending fractions 24 and 25, or the aqueous solutions of fraction 24 and 25 in varying ratios, the pH can be adjusted without the addition of an alkali or an acid (to the cocoa powder, the fractions, or otherwise). Additionally, by electrolytic separation in accordance with this invention, the part of the cocoa powder undesirable for use in the beverage is removed from fractions 24 and 25. The residue from the water extraction steps (water insoluble part of fractions 24 and 25) is bland tasting and can be used as a coloring agent.

Instead of dissolving out all of the water soluble parts of fractions 24 and 25 as set forth above, only part of the water soluble parts may be dissolved out, and the bottom part of the respective fraction with some water soluble parts therein can be used for making a high quality cocoa (or cocoa powder if dried).

Fraction 25 (without having water soluble parts removed therefrom) is a higher quality more pleasant tasting product than the initial cocoa powder.

Fraction 23 has a high flavor impact and is sharper tasting than the other two fractions to the extent of being of an obnoxious taste. Thus a flavor base made from fraction 23, as is, is undesirable for making a chocolate flavored beverage. However, as indicated above, the flavor base obtained from fraction 23 can be mixed with the flavor base obtained from one or both of the other two fractions. Thus the flavor base obtained from fraction 23 can be blended with a flavor base obtained from fraction 24 (and/or fraction 25) in relative amounts to obtain a mixture having a pH below about 6 for use as a flavor base. Also, if a food grade acid, such as citric acid, is added to a blend of fraction 23 and water in an amount to lower the pH below 6.0 and preferably to about 5, an excellent flavor base can be obtained for use in making carbonated or other type beverages. Also a food grade acid can be added to water soluble components that have been water extracted from fraction 23 prior to mixing the water soluble components with sugar and a food preservative to form a beverage syrup. The acid can also be added to the paste. If the paste is to be dried by spray drying for example, the acid should be added when the product is still in paste form. If the acid is added to the decanted liquid flavor base, as the acid is added the color changes from a dark to a lighter brown. The acidified flavor base obtained from fraction 23 has a greater flavor intensity than that obtained from the other two fractions. After the mixture of water, acid and fraction 23 is whipped, a fatty material may collect at the miniscus that should be removed. The liquid containing the soluble parts of fraction 23 is removed by decanting below the level of the fatty mass in order to obtain a clear finished product. The decanted liquid (flavor base) can be filtered through a commercially available filter to remove particles that float near the bottom to obtain a clearer flavor base.

Fraction 23 (or fraction 23 in combination with at least one of fractions 24 and 25) can be blended with three parts water to place at least part of the fraction (or fractions) in a first solution, the first solution separated from the undissolved part of the fraction (or fractions), one part of the above undissolved part of the fraction (or fractions) blended with three parts water to place an additional part of the fraction (or fractions) into a second solution, the second solution separated from the remaining undissolved part of the fraction (or fractions), the solutions separated from the undissolved parts mixed together to obtain a flavor base, and a food grade acid added to the flavor base to reduce the pH thereof to about 5.

A typical formula (by weight) for a chocolate flavored beverage using an acidified flavor base prepared from fraction 23 is as follows:

| Sugar syrup | 8.425% |
| --- | --- |
| *Chocolate flavor paste | 1.385% |
| Carbonated water | 90.037% |
| NA benzoate | .100% |
| Citric acid | .053% |

*Weight of the paste prior to water soluble parts being removed by adding water and filtering (or decanting) does not include weight of acid added.

In making a chocolate flavored beverage, the water soluble components of fraction 23 can be mixed with sugar and carbonated water, and a food grade acid added to either the water soluble components or to the mixture of water soluble components, sugar and carbonated water to obtain a beverage having a pH less than about 6.0.

If the ratio of water to cocoa is increased too high, for example 5 parts water to one part cocoa (by weight), the fluidity of the resulting blend makes it difficult to electrically separate the bend into three distinct fractions on the basis of pH. The 5 to 1 blend can be separated centrifugally or electrically (continuous fractionation by electrophoresis). However, the fractions have a pH in the range of the initial 5:1 blend. Furthermore, the 5 to 1 blend, when separated electrically results in two or three fractions; however, these fractions have a different taste and color than those obtained when a lower ratio of water to cocoa is prepared, and the product is treated beyond the point of separation (or over a period of, for example, 5 minutes). A blend of ⅓ cocoa powder and ⅔ water has been found to be ideal for the equipment used developing this process.

Furthermore, when the blend of ⅓ cocoa and ⅔ water was centrifuged, under the same conditions that the 5 to 1 blend was centrifuged, the 1 to 2 blend did not show separation into fractions.

Ratios as high as 1 part cocoa to 2.75 parts water by weights have been used successfully. However, due to the fluidity of the mix, 1 to 2 ratios are preferred.

If desired, water can be blended with cocoa paste fraction 25 to achieve about the same ratio of water to cocoa powder (2:1) as used initially and the blend electrolytically treated in the same manner as the initial paste was treated. In such an event there is again obtained three fractions 23, 24, 25 that are in about the same ratios and of pH's as that obtained by initially electrolytically treating the cocoa paste. However, as previously indicated with reference to fraction 24, there is a limit to the number of times the process can be repeated and still electrically separate one fraction into three fractions.

Paste from fraction 25 (combined with paste from fraction 23 or 24) can be mixed with a bland tasting cocoa colored filler, dried and used as an "extended" cocoa powder, or the paste can be dried and then mixed with the filler.

Fluid milk type products have been flavored by adding water soluble portions of fractions 24 and 25. A typical formula (by weight) is:

| Skim milk | 61.02% |
| --- | --- |
| Chocolate flavor base | 30.53% |
| Sugar syrup | 8.25% |
| Calcium carrageenans | .2% |

Note: Although calcium carrageenans was added to impart body to the finished beverage, a number of different food grade gums are available that can be used. In the above formula, the chocolate flavor base contains about one part of the fraction and 8 parts liquid.

Water soluble fractions made as set forth in this application can be used to replace cocoa powder in products such as puddings, pies, ice cream and frozen desserts. In fact, the undesirable "cracking" found on the surface of chocolate puddings and pies, experienced frequently when cocoa powder is used, is greatly reduced when the cocoa powder is replaced by water soluble fractions 24 and/or 25.

Fraction 25 (the paste), having a flavor superior to the initial cocoa powder, can be added to produce high quality confections and chocolate syrup.

There are many application for the fractions obtained by treating cocoa powder in accordance with this invention as there are for cocoa powder itself. In many instances using a fraction (or fractions) of this invention is more desirable than using cocoa powder for reasons such as the following:

(1) Better solubility: the fractions described in the invention are already in an aqueous state, (2) Flavor adjustment: by varying the ratios of fractions 23, 24 and 25 added to the flavor base the taste imparted to a finished product can be adjusted, (3) Color adjustment: by varying the portions of fraction 23 (dark) and fraction 25 (light) added in making the finished product, the color of the finished product can be adjusted.

(4) Undesirable effects of using cocoa powder in making a finished product are eliminated by replacing the cocoa powder with cocoa fractions obtained in accordance with the methods of the invention set forth herein.

(5) Water soluble parts that contain the chocolate flavor do not readily separate out of solution as indicated above.

Soy flour, corn flour, dried whey, field pea flour and field pea powder can be treated in the manner described with reference to separating the cocoa into three fractions. For example, three parts water were blended with one part defatted soy flour and the blends were put between screens 15 and 16. Current was passed through the mass for about 3 hours which resulted in the blend separating into three fractions 23, 24 and 25. When these fractions were blended with four parts water by weight and pH's read on liquid decanted off, fraction 23 and a pH of 12, fraction 24 had a pH of 4.3 and fraction 25 had a pH of 7.0. Fraction 24 had a blander flavor then the soy flavor before treatment and appeared to pick up a sweeter flavor when stored for a week or so at 40° F. Fraction 25 appeared to have a typical soy flavor that developed pleasant milk like tones when stored at 40° F. Fraction 23 had an undesirable taste and smell at all times.

One part corn flour was blended with six parts water and electrically separated into 3 fractions (23, 24 and 25). These fractions were then mixed with three parts water. Liquid topped from fraction 23 mixture had a pH of 10, liquid topped from fraction 24 mixture had a pH of 3.6 and the liquid topped from fraction 25 mixture had a pH of 5.2. The initial pH of the corn flour, which was measured of the liquid decanted from a mixture of one part corn flour and three parts water, was about 6.0. 2.4 parts dried whey was blended with 1 part water and electrically separated into three fractions (23, 24 and 25); these fractions were mixed with three parts water. Liquid topped from fraction 23 had a pH of 11.5, liquid topped from fraction 24 had a pH of 6.0 and liquid topped from fraction 25 had a pH of 6.2. Paste and liquid from fraction 24 had a more pleasant taste and smell than the initial whey powder.

One part field pea flour (ground raw field peas) was blended with one part water and electrically separated into 3 fractions (23, 24 and 25). Each of the fractions were then mixed with five parts of water. Liquid topped from the fraction 23 mixture had a pH of 11.65, liquid topped from the fraction 24 mixture had a pH of 4.06, and liquid topped from the fraction 25 mixture had a pH of 7.50. Fraction 23 had a sharp pea taste, much sharper than the field pea flour that was treated, while fractions 24 and 25 had a blander taste than the field pea flour. The fraction 25 water mixture, after setting, showed color separation in that a white granular substance collected in a solid band near the bottom of the container as did fraction 23. As to the fraction 24 water mixture, after setting, material separated and either settled on the bottom of the container or floated on the top of the dispersion, leaving the center relatively clear. The untreated field pea flour, when mixed with water and allowed to set, resembled the fraction 24 water mixture after setting in that it showed a clear separation of solids and liquid.

The same procedure as set forth in the preceding paragraph was used for treating field pea powder (precooked field pea flour) and measuring the pH of the fractions. Fraction 23 water mixture had a pH of 11.9, the fraction 24 water mixture had a pH of 4.55 and the fraction 25 water mixture had a pH of 6.15. Fraction 23 had a sharper flavor than either of fraction 24 or fraction 25. After setting, the fraction 24 water mixture showed a white ring and clear separation while the fraction 25 water mixture had material floating on the top as well as setting on the bottom.

It was unexpectedly found that the pH did not vary greatly within limited ranges of dilution as indicated in the table below for cocoa fractions.

| Fraction | pH Diluted 1:1 | pH Diluted 3:1 | pH Diluted 3:1 and decanted |
|---|---|---|---|
| 23 | 13.1 | 12.8 | 12.6 |
| 24 | 1.8 | 2.2 | 2.3 |
| 25 | 6.9 | 6.9 | 7.0 |

In the above table "pH Diluted 1:1", one part of the fraction was mixed with one part of water and the pH of the mixture was measured. With reference to "pH Diluted 3:1", one part of the fraction was mixed with three parts of water and the pH of the mixture was measured. As to "pH Diluted 3:1 and decanted", one part of the fraction was mixed with three parts of water, and after setting for about ½ hr., liquid was decanted and the pH of the decanted liquid was measured.

The process of the invention has been used successfully on products high in protein (soy flour) and high in carbohydrates (corn flour).

What is claimed is:

1. A method of treating a powdered food ingredient such as soy flour, corn flour, dried whey, cocoa powder, field pea powder or field pea flour comprising blending the ingredients with water to form a paste, substantially retaining the paste between two spaced electrically conductive plates or screens and in contact therewith, and applying a potential difference to the plates or screens to pass a D.C. current through the paste for a sufficient period of time to separate the paste into three fractions that are of substantially different pHs from each other with one fraction being adjacent to one plate or screen, a second fraction being adjacent to the other plate or screen, and a third fraction being between the first and second fractions, and the one fraction having a substantially lower pH than the second fraction.

2. The method of claim 1 wherein the food ingredient is soy flour and the blending step comprises blending about three parts of water with one part of soy flour.

3. The method of claim 2 wherein the potential difference application step is carried out for a period of time that after the fractions have each been mixed with four parts water and after setting and being decanted, the liquid decanted from the mixture of the one fraction has a pH of about 4.3, the liquid decanted from the mixture of the second fraction has a pH of about 12.0, and the liquid decanted from the mixture of the third fraction has a pH of about 7.0.

4. The method of claim 1 wherein the ingredient is field pea flour and the blending step comprising blending about one part of water with one part field pea flour.

5. The method of claim 4 wherein the potential difference application step is carried out for a sufficient period of time that after the fractions have each been mixed with five parts water and after setting and being decanted, the liquid decanted from the mixture of the one fraction has a pH of about 4.05, the liquid decanted from the mixture of the second fraction has a pH of about 11.65, and the liquid decanted from the mixture of the third fraction has a pH of about 7.5.

6. The method of claim 1 wherein the ingredient is field pea powder and the blending step comprises blending about one part pea powder and one part water.

7. The method of claim 6 wherein the potential difference application step is carried out for a sufficient period of time that after the fractions have each been mixed with five parts water and after setting and being decanted, the liquid decanted from the mixture of the one fraction has a pH of about 4.55, the liquid decanted from the mixture of the second fraction has a pH of about 11.9, and the liquid decanted from the mixture of the third fraction has a pH of about 6.15.

8. The method of claim 1 wherein the ingredient is cocoa powder, the second fraction has a pH of at least about 12, water extracting water soluble components from the second fraction and mixing the water soluble components with a food grade acid, sugar and a food preservative to form a beverage syrup, the food grade acid being added in an amount that the mixture has a pH of about 5.

9. The method of claim 8 wherein the acid is added to the water soluble components prior to mixing the water soluble components with sugar and the food preservative.

10. The method of claim 1 wherein the ingredient is corn flour and the blending step comprises blending about one part corn flour and six parts of water.

11. The method of claim 10 wherein the potential difference application step is carried out for a sufficient period of time that after the fractions have each been mixed with three parts water and after setting and being decanted, the liquid decanted from the mixture of the one fraction has a pH of about 3.6, the liquid decanted from the mixture of the second fraction has a pH of about 10, and the liquid decanted from the mixture of the third fraction has a pH of about 5.2.

12. The method of claim 1 wherein the ingredient is dried whey and the blending step comprises blending about 2.4 parts dried whey and one part water.

13. The method of claim 12 wherein the potential difference application step is carried out for a sufficient period of time that after the fractions have each been mixed with three parts water and after setting and being decanted, the liquid decanted from the mixture of the one fraction has a pH of about 6.0, the liquid decanted from the mixture of the second fraction has a pH of about 11.5, and the liquid decanted from the mixture of the third fraction has a pH of about 6.2.

14. The method of claim 1 wherein the ingredient is cocoa powder and the potential difference application step is carried out for a sufficient period of time that after the fractions have each been mixed with three parts water and after setting and being decanted, the liquid decanted from the mixture of the one fraction has a pH of about 2.3-2.5, the liquid decanted from the mixture of the second fraction has a pH of about 12.0-12.6, and the liquid decanted from the mixture of the third fraction has a pH of about 5.4-7.0.

15. The method of claim 14 further including the step of using the second fraction in a recipe calling for dutched cocoa.

16. The method of claim 14 further including blending at least one of the fractions with water, allowing the water and fraction blend to stand to permit the undissolved material to settle and using the resulting water solution as a flavor base for a beverage.

17. The method of claim 14 wherein the blending of water and cocoa powder comprises blending about two parts water with one part cocoa powder.

18. The method of claim 14 wherein the blending of water and cocoa powder comprises blending less than 2.75 parts water with one part cocoa powder.

19. The method of claim 14 further including blending one of the three pH fractions with about three parts water to place at least part of the fraction in a solution, and separating the solution from the undissolved parts therein.

20. The method of claim 14 further including blending the highest pH fraction with about three parts water to place at least part of the highest pH fractin in solution, blending at least one of the other two pH fractions with about three parts water to place at least part of said at least one of the other two pH fractions in a solution, separating each of the above solutions from the undissolved part of the respective fraction, blending together the separated solutions in relative amounts to obtain a mixture having a pH below about 6 and using said blend of separated solutions as a flavor base.

21. The method of claim 14 further including blending the highest pH fraction with water to place at least part of the highest pH fraction in solution, separating the undissolved part of the fraction to obtain a beverage flavor base, and adding a sufficient amount of food grade acid to the flavor base to obtain a mixture having a pH of less than about 6.

22. The method of claim 21 wherein the blending step includes whipping and the separating step includes allowing the water and highest pH blend to stand to allow undissolved particles to settle and fatty materials to rise to the top and thereafter decanting liquid below the level of the fatty material, and filtering the decanted liquid.

23. A method of treating cocoa powder comprising passing a D.C. current, from a generally vertical first electrically conductive screen, through a paste of cocoa powder and water that is in contact with the first screen to a generally vertical second electrically conductive screen that is in contact with the paste and is horizontally spaced from the first screen, both screens being present in a non-electrically conductive container, for a sufficient period of time to separate the paste into three fractions that are of substantially different pH's from one another.

24. The method of claim 23 wherein the paste is of a sufficiently high viscosity to be substantially entirely retained horizontally between the two electrically conductive screens when said screens are extended across the container.

25. The method of claim 23 wherein the paste is a blend of about 2 to 2.75 parts water to one part cocoa powder.

26. The method of claim 23 wherein pH's of about 2.5, 5.4 to 7.0 and 12.0 to 12.6 are obtained respectively for the three fractions.

27. The method of claim 23 further including blending at least one fraction with about three parts water to place part of said at least one fraction in a first solution, separating the first solution from the undissolved part of the fraction, blending one part of the undissolved part of the fraction with about three parts water to place an additional part of the one fraction into a second solution, and separating the second solution from the remaining undissolved part of the fraction.

28. The method of claim 27 further including mixing the solutions with sugar and carbonated water to make a chocolate flavored carbonated beverage.

29. The method of claim 27 wherein said one fraction has a pH of at least about 12.0, and further including mixing together the separated solutions to obtain a flavor base and adding a food grade acid to the flavor base to reduce the pH thereof to about 5.

30. The method of claim 23 including decanting of water soluble components from the two lowest pH fractions and blending the water soluble components for use in making a chocolate flavored beverage.

31. The method of claim 30 further including mixing the water soluble components with sugar, a coloring and a food preservative to form beverage syrup.

32. The method of claim 31 further including adding soda water to the beverage syrup to form a carbonated beverage.

33. A method of treating a powdered food ingredient such as soy flour, corn flour, dried whey, cocoa powder, field pea flour or field pea powder comprising blending the food ingredient with a quantity of water to form a paste of a sufficiently high viscosity to be substantially entirely retained horizontally between spaced electrically conductive vertical screens in a non-electrically conductive container, dispensing the paste between the screens in the container, and applying a potential difference to the screens to pass a D.C. current through the paste for a sufficient period of time to separate the paste into three fractions that are of substantially different pH's from one another.

34. The method of claim 33 wherein the food ingredient is cocoa powder, and at least one of the fractions is used in making a pie.

35. The method of claim 33 wherein the food ingredient is cocoa powder and at least one of the two lowest pH fractions is added to a milk product.

36. The method of claim 33 wherein the food ingredient is cocoa powder, water soluble components are water extracted from the highest pH fraction, the water soluble components are mixed with sugar and carbonated water to make a chocolate flavored beverage, and a food grade acid is added to the water soluble components or to the mixture of water soluble components, sugar and carbonated water to obtain a beverage having a pH less than about 6.0.

37. In a method of extending the flavor of cocoa powder, the steps of blending about 2 to 2.75 parts water with one part cocoa powder to form a paste, substantially retaining the paste between two horizontally spaced electrically conductive screens and in contact therewith, applying a potential difference to the screens to pass a D.C. current through the paste for a sufficient period of time to separate the paste into three fractions that are of substantially different pH's from one another and blending one fraction with at least one of the other two fractions.

* * * * *